(12) United States Patent
Wang et al.

(10) Patent No.: US 7,747,225 B2
(45) Date of Patent: Jun. 29, 2010

(54) MOBILE ASSISTED DOWNLINK BEAMFORMING WITH ANTENNA WEIGHT FEEDBACK

(75) Inventors: Fan Wang, Chicago, IL (US); Stanley J. Benes, Round Lake Beach, IL (US); Amitava Ghosh, Buffalo Grove, IL (US); Jun Tan, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 232 days.

(21) Appl. No.: 11/538,432

(22) Filed: Oct. 3, 2006

(65) Prior Publication Data

US 2008/0081671 A1    Apr. 3, 2008

(51) Int. Cl.
H04B 17/00 (2006.01)
H04B 1/00 (2006.01)
H04B 7/00 (2006.01)
H04B 7/185 (2006.01)
H04M 1/00 (2006.01)
H04W 4/00 (2009.01)

(52) U.S. Cl. .................. 455/69; 455/562.1; 455/67.11; 370/334; 370/318

(58) Field of Classification Search ............. 455/63.1, 455/67.11, 67.13, 67.14, 68, 69, 561, 562.1, 455/522; 370/318, 334
See application file for complete search history.

(56) References Cited

U.S. PATENT DOCUMENTS

| 6,907,272 | B2* | 6/2005 | Roy .................. 455/562.1 |
| 7,020,110 | B2* | 3/2006 | Walton et al. ............ 370/334 |
| 2004/0014501 | A1* | 1/2004 | Kuwahara et al. ........ 455/561 |
| 2004/0178954 | A1* | 9/2004 | Vook et al. ............... 342/383 |
| 2006/0034165 | A1* | 2/2006 | Levy ..................... 370/208 |
| 2006/0035643 | A1* | 2/2006 | Vook et al. .............. 455/450 |
| 2006/0040618 | A1* | 2/2006 | Braun et al. .............. 455/69 |
| 2006/0073801 | A1* | 4/2006 | Wang et al. ............ 455/226.1 |
| 2006/0094435 | A1 | 5/2006 | Thomas et al. |
| 2007/0092019 | A1* | 4/2007 | Kotecha et al. .......... 375/267 |
| 2007/0195811 | A1* | 8/2007 | Basson et al. ........... 370/441 |
| 2007/0213013 | A1* | 9/2007 | Kim ...................... 455/69 |
| 2007/0249296 | A1* | 10/2007 | Howard et al. .......... 455/101 |
| 2008/0069031 | A1* | 3/2008 | Zhang et al. ............ 370/328 |
| 2008/0130790 | A1* | 6/2008 | Forenza et al. .......... 375/299 |

OTHER PUBLICATIONS

IEEE Std. 802.16e—2005 and IEEE Std 802.16—2004/Cor 1-2005, IEEE Standard for Local and Metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, IEEE Std 802.16-2005-Approved Dec. 7, 2005, IEEE Std 802.16-2004/Cor 1-2005-Approved Nov. 8, 2005, Section 8.4.6.2.7.

* cited by examiner

*Primary Examiner*—Nay A. Maung
*Assistant Examiner*—Andrew Wendell

(57) ABSTRACT

A subscriber unit (104) with multiple receive antennas (160, 162) and a single transmit antenna (160) derives beamforming weights to be used at a base station (102) with multiple transmitting antennas (602, 604, 606, and 608). The downlink beamforming weights are derived at the subscriber unit (104) from a prior downlink transmission from the base station (102) to the subscriber device (104) and an uplink sounding signal is used to carry derived downlink beam forming weights to the base station (102). Downlink antenna specific pilots (without weight) are used at the subscriber device (104) to determine the beamforming weights. Decimated sounding signals, where the number of sounding subcarriers is at least the same as the number of antennas at the base station (102), allow multiple users to sound at the same time.

4 Claims, 6 Drawing Sheets

MOBILE ASSISTED DOWNLINK BEAMFORMING WITH ANTENNA WEIGHT FEEDBACK

FIELD OF THE INVENTION

This invention relates in general to wireless communication, and more specifically, to downlink beamforming from base stations to mobile devices with multiple receiver antennas.

BACKGROUND OF THE INVENTION

Communications systems are generally defined in terms of their communications parameters (e.g. data rate, channel bandwidth, modulation type etc.). The communications parameters of communications systems are chosen according to the characteristics of the communications channel and the type of communications required.

In mobile communications systems, the propagation of signals between communicating units are affected by the rapidly varying multipath and fading characteristics of the communications channel. Consequently the communications parameters for such mobile communications systems are chosen to take into account the variations in the gain and delay characteristics of the channel due to multipath and fading effects.

Generally the communications parameters of a communications system are fixed. However, to maximize system performance in a mobile communications system, it is advantageous to continuously optimize the communications parameters of the communications system according to the current state of the rapidly varying communications channel.

In order to continuously optimize the communications parameters of a mobile communications system, accurate, real-time information on the characteristics of the communications channels is gathered. The information is then processed and the communications parameters of the system are optimized according to the current channel characteristics.

In the early 1970s, proposals for determining forward channel sounding information were developed. In a communications system that uses a forward channel sounder, the mobile unit transmits a known tone or sequence in an uplink to a Base Station (BS). BSs are medium to high-power multi-channel two-way radios which are in a fixed location and serve as access points between mobile devices and the rest of a communication system. The base station then processes the information and transmits in a downlink the desired communications parameters to the mobile unit for use in future communications between the two communicating units. For TDD systems, the downlink (DL) RF channel is similar to the uplink (UL) RF channel, and thus can be derived at the BS using an uplink sounding signal.

A known method of increasing communication performance is through antenna "beamforming." Beamforming is a signal processing technique used with an array of antennas, where the directionality of a radiation pattern is controlled by adjusting the phase of the coordinated antennas. When transmitting a signal, beamforming can be used to increase the gain in the direction the signal is to be sent by adjusting the phase of each antenna to create peaks and nulls in the radiation pattern.

An example of a mobile unit communicating with BSs is a mobile unit with two receive antennas, but only one transmit antenna. The DL channel information is used to properly perform the downlink beamforming of the base station antennas. In TDD systems, UL sounding signals from the single transmit antenna of the mobile unit do not provide the DL channel information from the BS antennas to the non-transmitting but receiving-only antenna(s) of the mobile unit. In FDD systems, the estimated UL channel information from the UL sounding signal differs from the DL channel since the UL and DL are on different carrier frequency.

Therefore a need exists to overcome the problems with the prior art as discussed above.

SUMMARY OF THE INVENTION

Briefly, in accordance with the present invention, disclosed is a method on an RF communications receiver includes receiving n downlink pilot signals with at least one receive antenna at a receiver, each of the n downlink pilot signals being associated with a respective one of n downlink transmit antennas at a remote transmitter transmitting the n downlink pilot signals. The method further includes determining, based upon the received n downlink pilot signals, a respective RF propagation channel between each respective receive antenna within the at least one receive antenna at the receiver and each respective downlink transmit antenna within n downlink transmit antennas at the remote transmitter. The method also includes determining, based upon characteristics of each respective downlink RF propagation channel, n downlink transmit antenna weighting factors for each downlink data stream from the remote transmitter to the receiver, each downlink transmit antenna weighting factor within the n downlink transmit antenna weighting factors corresponding to a respective weighting factor to be applied to one respective downlink transmit antenna within n downlink transmit antennas and one respective downlink data stream being transmitted from the remote transmitter to the receiver within at least one downlink data streams. The method also includes modulating a respective modulation signal onto each uplink subcarrier within n uplink subcarriers, wherein each respective modulation signal comprises a respective complex value corresponding to one respective downlink transmit antenna weighting factor within the n downlink transmit antenna weighting factors, and transmitting the uplink subcarriers.

In accordance with another aspect of the present invention, a base station includes a receiver adapted to receive, from a remote transceiver at a local transceiver, a plurality of signals on uplink subcarriers, wherein each uplink signal in the plurality of uplink signals is modulated by a respective complex value comprising a representation of a downlink transmission antenna weight to be applied to a respective downlink transmit antenna at the local transceiver. The base station further includes a weight extraction processor adapted to extract, by demodulating the plurality of signals on uplink subcarriers, a plurality of downlink transmission antenna weights comprising each of the respective complex values modulated signal onto each respective uplink subcarrier.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Embodiments of the present invention provide a system for downlink beamforming in a FDD wireless communication network and in a TDD wireless communication network having mobile transmitter/receiver devices, referred to herein as "subscriber units" (SUs), with normally a greater number of receive antennas than transmit antennas. In accordance with embodiments of the present invention, the SU determines downlink beamforming weights to be applied to the transmit antennas of a "base station" (BS) based on the previous downlink transmission for downlink antenna specific pilot symbols. The downlink beamforming weights, in one example, are complex numbers, which are applied to transmitted downlink signals to form a transmit pattern adapted to propagation channels between each transmit antenna of the base station and each receive antenna of the mobile SU. The SU communicates the determined beamforming weights using the uplink sounding channel. The BS combines the received signal on sounding symbol subcarriers to determine the BS weights for each antenna and then forms the corresponding beams for each SU receiver antenna based on weights received from the SU on the uplink sounding channel.

Figure 1:
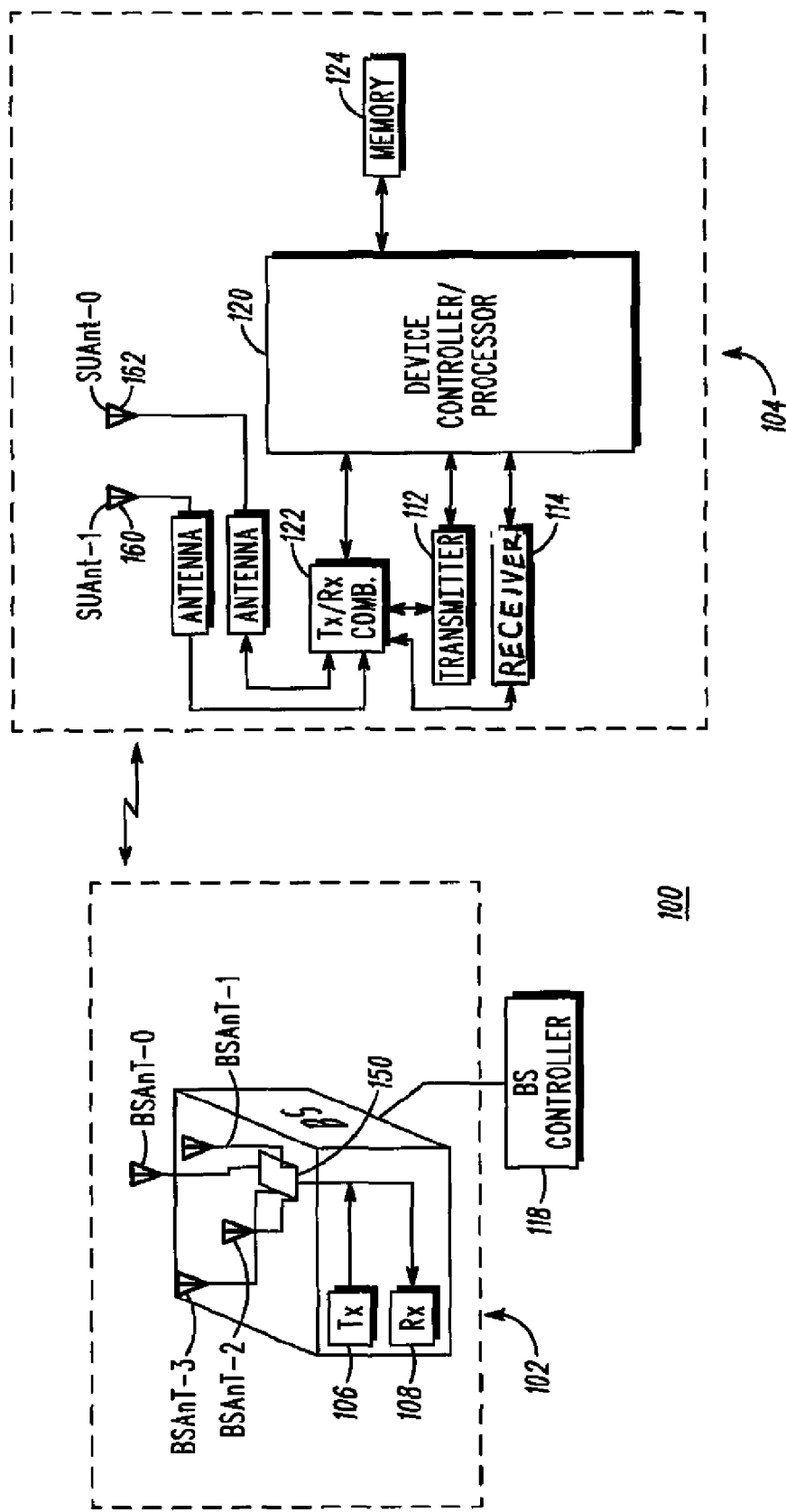
FIG. 1 is a block diagram illustrating an exemplary communication network.

FIG. 1 shows a block diagram of a communications system 100. A first communications unit 102 is a BS and a second communications unit 104 is a SU. The BS 102 includes both a transmitter 106 and a receiver 108 operably coupled to an array of four antennas BSAnt-0, BSAnt-1, BSAnt-2, and BSAnt-3, for communicating to the SU 104. The coupling of the transmitter 106 and receiver 108 to the array of four antennas BSAnt-0, BSAnt-1, BSAnt-2, and BSAnt-3 is accomplished through a weighting unit 150. The interconnections of the weighting unit 150 are shown in FIG. 6.

Figure 6:
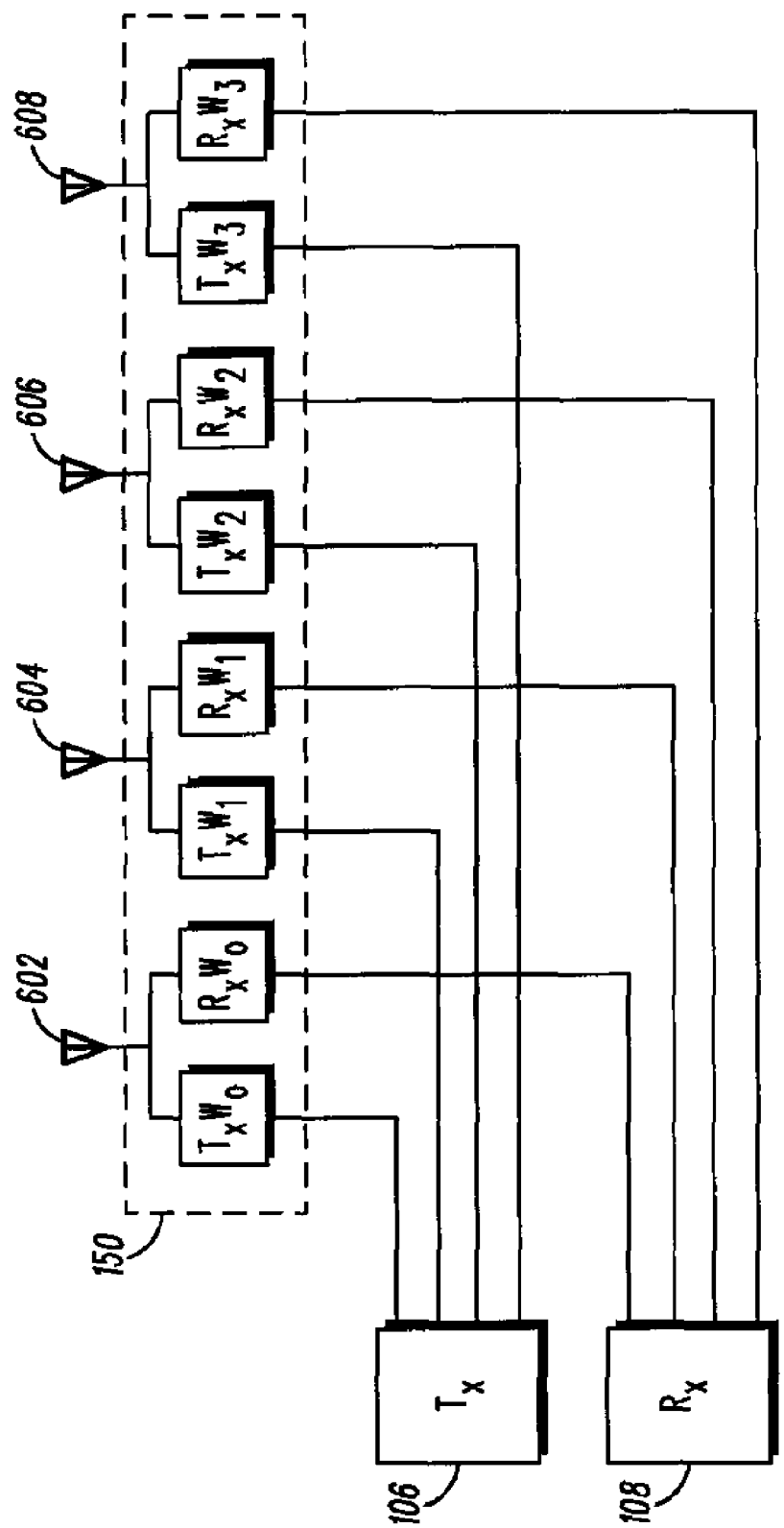
FIG. 6 illustrates RF interconnections between multiple base station antennas, a base station receiver and a base station antenna through a weighting unit, according to an embodiment of the present invention.

As can be seen in FIG. 6, weighting unit 150, includes a set of transmit weighting multipliers $T_xw_0$, $T_xw_1$, $T_xw_2$, and $T_xw_3$ and a set of receive weighting multipliers $R_xw_0$, $R_xw_1$, $R_xw_2$, and $R_xw_3$. A separate one of the weighting multipliers $T_xw_0$, $T_xw_1$, $T_xw_2$, and $T_xw_3$ is coupled between the transmitter 106 and each of the BS antennas, BSAnt-0 602, BSAnt-1 604, BSAnt-2 606, and BSAnt-3 608, respectively. Each multiplier, $T_xw_0$, $T_xw_1$, $T_xw_2$, and $T_xw_3$, multiplies the transmit signal by a specified complex weight $w_0$, $w_1$, $w_2$, and $w_3$, respectively.

Similarly, a set of receive weighting multipliers $R_xw_0$, $R_xw_1$, $R_xw_2$, and $R_xw_3$ are coupled between the receiver 108 and each of the BS antennas, BSAnt-0 602, BSAnt-1 604, BSAnt-2 606, and BSAnt-3 608, respectively. Each multiplier, $R_xw_0$, $R_xw_1$, $R_xw_2$, and $R_xw_3$, multiplies the receive signal by a specified weight $w_0$, $w_1$, $w_2$, and $w_3$, respectively.

The BS 102 is controlled by a controller 118. The controller 118 is the brains behind the BS 102 and handles allocation of radio channels, receives measurements from the SUs, sets beamforming weight for the transmit and receive antennas and controls handovers from BS to BS. Additionally, databases for the sites, including information such as carrier frequencies, frequency hopping lists, power reduction levels, receiving levels for cell border calculation, are stored in, or communicatively coupled to, the controller 118.

The SU 104 includes a receiver 114 operably coupled to two receive antennas SUAnt-0 160 and SUAnt-1 162 and also includes a transmitter 112 operably coupled to SUAnt-0 160, which is both a transmit and receive antenna. Therefore, there are 4 transmitting antennas at the BS 102 and 2 receive antennas at SU 104. In this example, there are eight BS to SU downlink propagation channels—a channel from each BS transmit antenna to each SU receive antenna.

The SU 104 operates under the control of a device controller/processor 120, that controls the sending and receiving of wireless communication signals. In receive mode, the device controller 120 electrically couples the antennas SUAnt-0 160 and SUAnt-1 162 through a transmit/receive signal combiner 122 to the receiver 114. The receiver 114 decodes the received signals and provides those decoded signals to the device controller 120.

In transmit mode, the device controller 120 electrically couples the transmitter 112 to the antenna SUAnt-0 160 through the transmit/receive signal combiner 122. The device controller 120 operates the transmitter 112 and receiver 114 according to instructions stored in a memory 124.

The SU 104, in one embodiment, is capable of wirelessly communicating data using the IEEE 802.16e standard, 3GPP/3GPP2 standards, or any other communication scheme that supports Time Division Duplex (TDD) or Frequency Division Duplex (FDD). As provided by the TDD communication scheme, the uplink (UL) and downlink (DL) channels are symmetric after BS antenna calibration.

Figure 2:
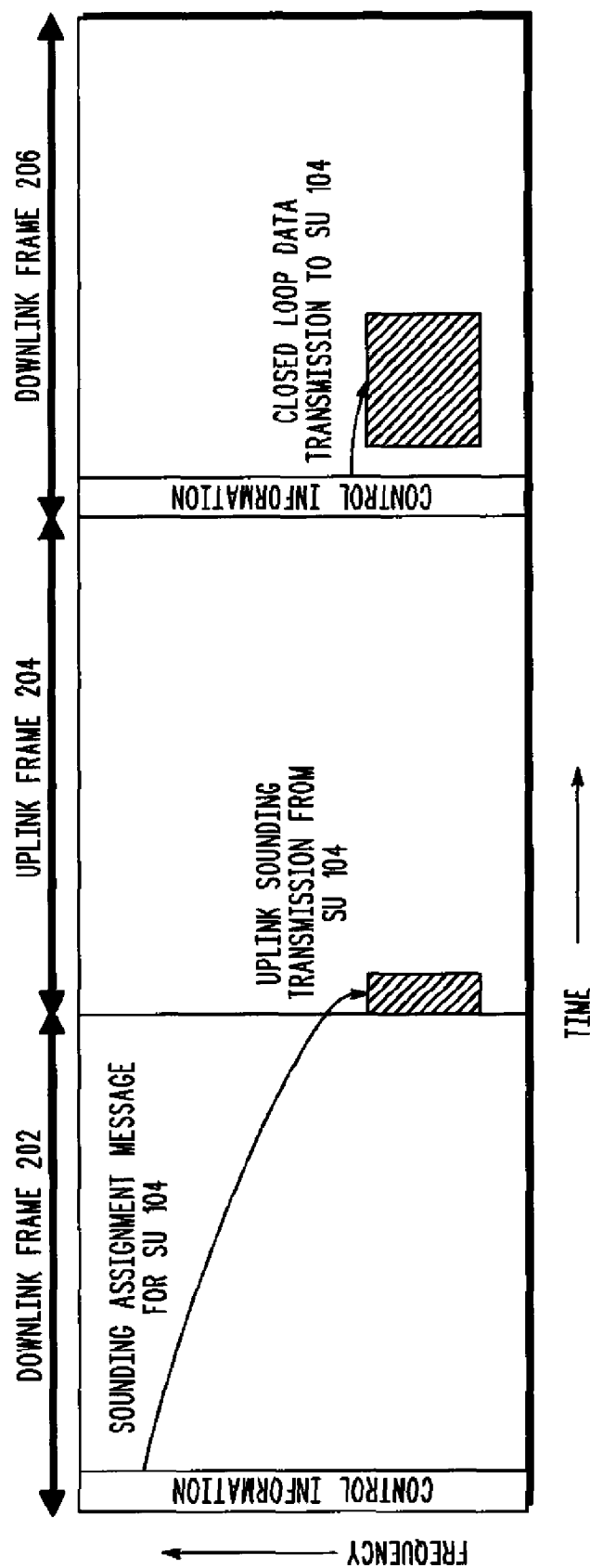
FIG. 2 is a TDD plot showing the relationship between DL, UL, UL sounding, and related DL data transmission according to an embodiment of the present invention.

FIG. 2 shows a timing diagram for a TDD Frequency Division Multiple Access (FDMA) scheme. In a communications system using a TDD OFDMA scheme the communications units are allocated time slots on a single frequency for transmission and reception of signals.

The RF propagation channel between each transmitting BS antenna and each MS antenna for a subcarrier k is denoted as show in Table A.

TABLE A

|  | BS Ant-0 | BS ant-1 | BS ant-2 | BS ant-3 |
| --- | --- | --- | --- | --- |
| MS ant-0 | H00[k] | H10[k] | H20[k] | H30[k] |
| MS ant-1 | H01[k] | H11[k] | H21[k] | H31[k] | where H is the RF propagation channel.

Figure 3:
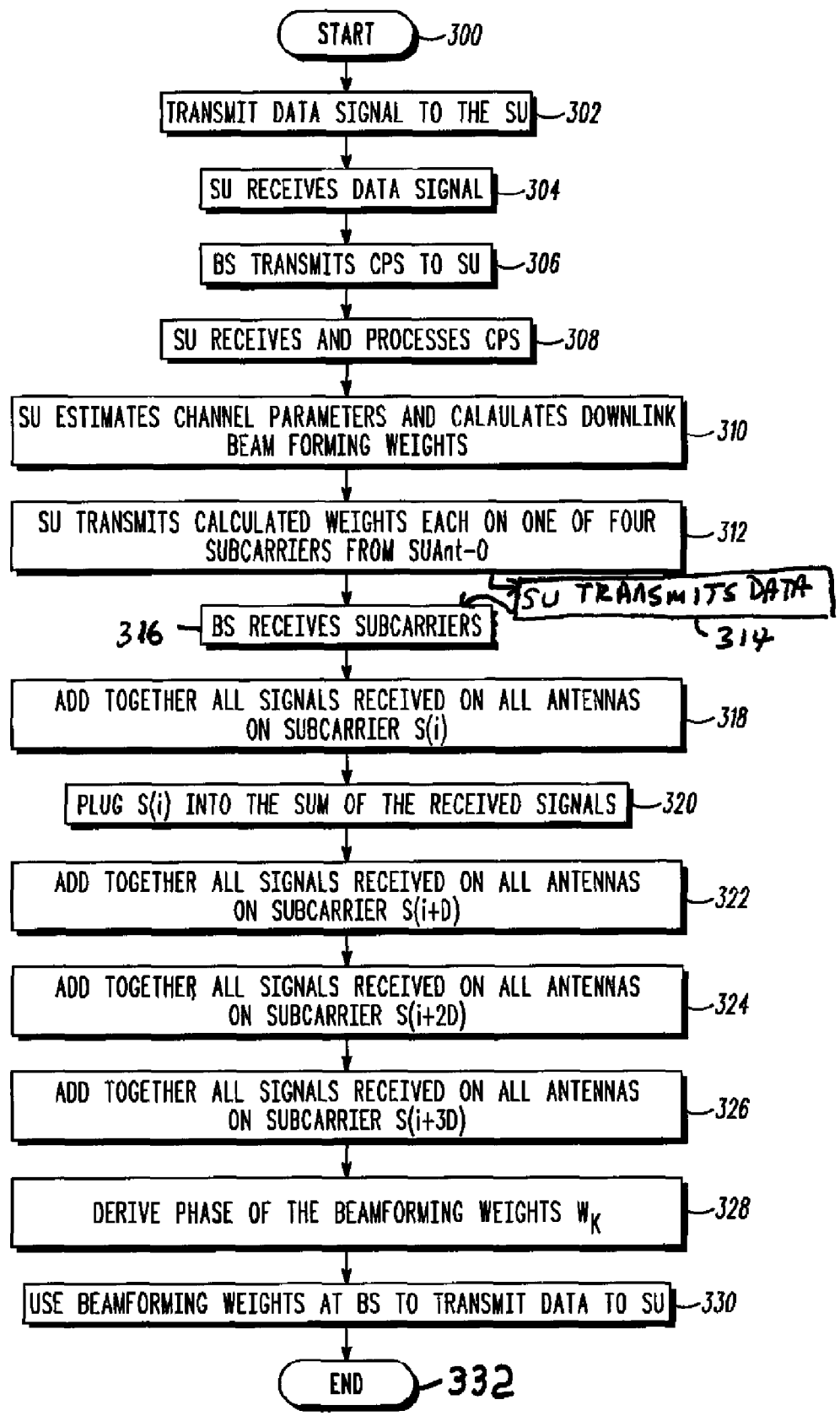
FIG. 3 is an operational flow diagram of a first TDD FDMA scheme according to an embodiment of the present invention.

The process flow diagram of FIG. 3, shows a first embodiment of the present invention. The process starts at step 300 and moves directly to step 302, where the BS 102 transmits a data signal to the SU 104 which, in turn, receives the data signal in step 304. Prior to the SU 104 responding by transmitting a data signal back to the BS 102, the BS 102 transmits a Common Pilot Signal (CPS) containing a pilot signal in step 306. The common pilot signal (CPS) sent by the BS 102 contains subcarrier frequencies and is transmitted by each BS 102 transmit antenna, as described below.

FIG. 2 shows the relationship between DL, UL, UL sounding, and related DL data transmission. In the TDD plot of FIG. 2, the DL control channel in the first frame 202 allocates UL sounding carriers for SU 104. The SU 104 transmits an UL sounding signal on the allocated subcarriers in the following UL frame 204. In the next frame 206, or several frames later if there is a processing delay, the BS forms a DL beam based on the received UL sounding signal.

Basically, there is a DL common pilot, i.e., DL pilot signal with no weight (beamforming) on the pilot signal. The SU calculates BS antenna weights based on DL common pilots from every BS antenna. The SU transmits an UL sounding signal, which carries the antenna weights calculated above. The BS then forms the DL beam to transmit DL data using the antenna weights communicated through the UL sounding signal. In a conventional use of UL sounding signals, there is no information carried on the sounding signal. That is, the UL sounding signal in conventional systems is similar to a reference signal.

After estimating the channel parameters, the SU 104 transmits, in step 312, S(i) on subcarrier i, S(i+D) on subcarrier i+D, S(i+2D) on subcarrier i+2D, and S(i+3D) on subcarrier i+3D as defined above, after modulating the product of the complex value corresponding to the antenna weights, as calculated at step 310, and the conjugate of the sum of complex values corresponding to the responses of the channels responses. The modulating in one embodiment includes modulating a respective modulation signal onto each uplink subcarrier within n uplink subcarriers, wherein each respective modulation signal comprises a respective complex value corresponding to one respective downlink transmit antenna weighting factor within the n downlink transmit antenna weighting factors. The modulation of the subcarriers, as described above, is able to be represented as modulating a respective signal on a first subcarrier within the n uplink subcarriers with a first antenna weight corresponding to at least one respective downlink data stream from the remote transmitter to the receiver; and modulating an $m^{th}$ of the n subcarriers with a complex value corresponding to an $m^{th}$ antenna weight corresponding to the at least one respective downlink data stream from the remote transmitter to the receiver, where each uplink subcarrier is separated from each other uplink subcarrier by a decimation factor, wherein $1 < m \leq n$. The modulation of some embodiments of the present invention is further described as summing, to produce a first sum, complex values corresponding to the respective RF

TABLE 1

| Sub-carrier i | $S(i) = w_0(H_{00}(i) + H_{10}(i) + H_{20}(i) + H_{30}(i))^H$ |
| --- | --- |
| Sub-carrier i + D | $S(i+D) = w_1(H_{00}(i+D) + H_{10}(i+D) + H_{20}(i+D) + H_{30}(i+D))^H$ |
| Sub-carrier i + 2D | $S(i+2D) = w_2(H_{00}(i+2D) + H_{10}(i+2D) + H_{20}(i+2D) + H_{30}(i+2D))^H$ |
| Sub-carrier i + 3D | $S(i+3D) = w_3(H_{00}(i+3D) + H_{10}(i+3D) + H_{20}(i+3D) + H_{30}(i+3D))^H$ |

$w_k$ Beamforming weight for BS antenna-k
D   Decimation factor where the subscript $^H$ represents the conjugate of a complex number.

In a TDD system, in order to identify the DL RF propagation channel between individual antennas, a subset of the UL subcarriers is transmitted from each mobile transmit antenna. Subcarrier i is on transmit antenna 0, subcarrier i+D is on transmit antenna 1, subcarrier i+2D is on transmit antenna 2, etc. The Decimation factor is the number of subcarriers between adjacent sounding subcarriers allocated to this mobile.

The SU 104 receives the DL common pilot signal (CPS) in step 308 after a short period, due to channel propagation and system delays, and processes the common pilot. The SU 104 then estimates channel parameters in a known way, and calculates downlink beamforming weights $w_0$ for BSAnt-0, $w_1$ for BSAnt-1, $w_2$ for BSAnt-2, and $w_3$ for BSAnt-3 in step 310 that are to be applied to the BS antennas.

propagation channel for the first subcarrier between n base station transmit antennas and a receive antenna within the at least one receive antennas that is capable of transmitting; calculating a conjugate of the first sum; multiplying the first downlink antenna weight by the conjugate of the first sum to produce the respective modulation signal; and scaling the respective modulation signal for the first subcarrier. Some embodiments quantize the complex value corresponding to the antenna weights prior to multiplying the antenna weight by the conjugate of the sum of the channel responses. This transmission is simultaneous in time, and only from the SU antenna SUAnt-0 160. In addition, scaling can be added on S(i), S(i+D), S(i+2D) and S(i+3D) to reduce the peak to average power ratio of the transmit signal.

The BS 102, in step 316, receives signals at each of the receive antennas, which are shown in Table 2 below.

TABLE 2

| Subcarrier | BS ant-0: R0 | BS ant-1: R1 | BS ant-2: R2 | BS ant-3: R3 |
|---|---|---|---|---|
| i | S(i) * H00(i) | S(i) * H10(i) | S(i) * H20(i) | S(i) * H30(i) |
| i + D | S(i + D) * H00(i + D) | S(i + D) * H10(i + D) | S(i + D) * H20(i + D) | S(i + D) * H30(i + D) |
| i + 2D | S(i + 2D) * H00(i + 2D) | S(i + 2D) * H10(i + 2D) | S(i + 2D) * H20(i + 2D) | S(i + 2D) * H30(i + 2D) |
| i + 3D | S(i + 3D) * H00(i + 3D) | S(i + 3D) * H10(i + 3D) | S(i + 3D) * H20(i + 3D) | S(i + 3D) * H30(i + 3D) |

In TABLE 2, R0 is the received signal on BS ant-0, R1 is the received signal on BS ant-1, R2 is the received signal on BS ant-2, R3 is the received signal on BS ant-3, According to one embodiment of the present invention for TDD systems, all signals received on all antennas on subcarrier i are added together in step 318 and the received signal is represented as:

$$r(i) = R_0(i) + R_1(i) + R_2(i) + R_3(i)$$
$$= S(i)(H_{00}(i) + H_{10}(i) + H_{20}(i) + H_{30}(i))$$

Next, in step 320, the value of s(i) as defined in table 1, as transmitted by SU 104, is inserted into the formula to solve for the encoded weight value to yield:

$$r(i) = w_0 |H_{00}(i) + H_{10}(i) + H_{20}(i) + H_{30}(i)|^2$$

In step 322, all signals received on all antennas on subcarrier i+D are added together and the received signal is represented as:

$$r(i + D) = R_0(i + D) + R_1(i + D) + R_2(i + D) + R_3(i + D)$$
$$= S(i + D)(H_{00}(i + D) + H_{10}(i + D) + H_{20}(i + D) + H_{30}(i + kD))$$
$$= w_1 |H_{00}(i + D) + H_{10}(i + D) + H_{20}(i + D) + H_{30}(i + D)|^2$$

In steps 324 and 326, all signals received on all antennas on subcarriers i+2D and i+3D, respectively, are added together. In summary, $$r(i + kD) = R_0(i + kD) + R_1(i + kD) + R_2(i + kD) + R_3(i + kD)$$
$$= S(i + kD)(H_{00}(i + kD) + H_{10}(i + kD) + H_{20}(i + kD) + H_{30}(i + kD))$$
$$= w_k |H_{00}(i + kD) + H_{10}(i + kD) + H_{20}(i + kD) + H_{30}(i + kD)|^2$$

where k=0, 1, 2, 3.

From the received signal r(i+kD), the phases for the beamforming weights $w_k$ are derived in step 328 according to the following formula:

$$\text{Phase}(w_k) = \text{Atan}\left(\frac{\text{Im}(r(i + kD))}{\text{Re}(r(i + kD))}\right)$$

Where Atan( ) is the Arctangent function, Im( ) is the imaginary part of a complex number, and Re( ) is the real part of a complex number.

The derived phase values are then, in step 330, used at the BS 102 in "equal gain beamforming", i.e., the amplitude of the beamforming weights are constant and the phase of the beamforming weights are from the formula above, to transmit data to the SU 104 by utilizing the derived weight $w_k$ for each of the transmit antennas BSAnt-0 through BSAnt-3. The process ends at step 332.

Figure 4:
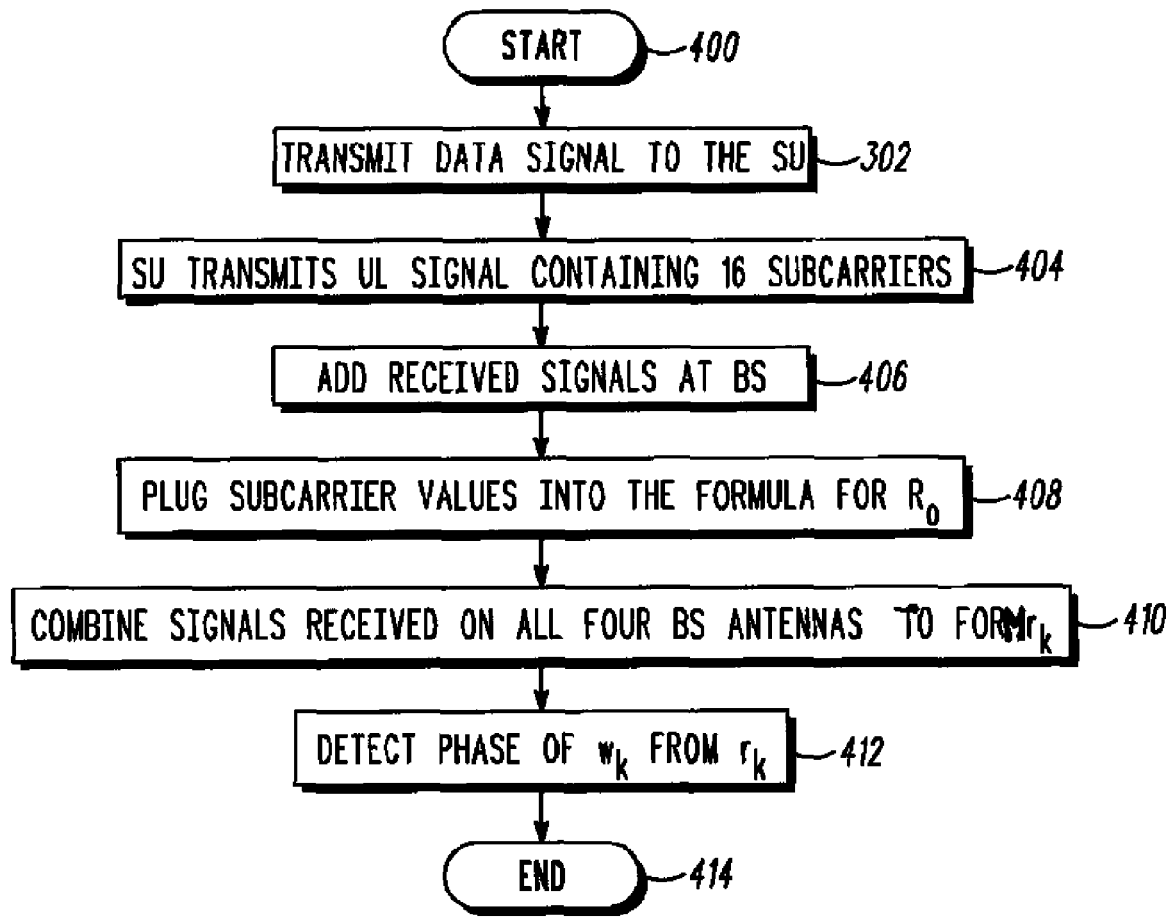
FIG. 4 is an operational flow diagram of a second TDD FDMA scheme according to an embodiment of the present invention.

In another embodiment of the present invention for TDD systems, as shown in the process flow diagram of FIG. 4, the SU 104 once again estimates channel parameters, and calculates the downlink beamforming weights $w_0$ for BS ant-0, $w_1$ for BS ant-1, $w_2$ for BS ant-2, and $w_3$ for BS ant-3, just as was done in step 302 of FIG. 3.

In a second step, 404, the SU 104 transmits an UL signal that contains 16 sounding symbol subcarriers. These subcarriers are received and processed by the BS antennas in groups of four. For example, BS antenna 0 receives subcarrier i, i+D, i+2D, and i+3D, BS antenna 1 receives subcarriers i+4D, i+5D, i+6D, and i+7D, and so forth.

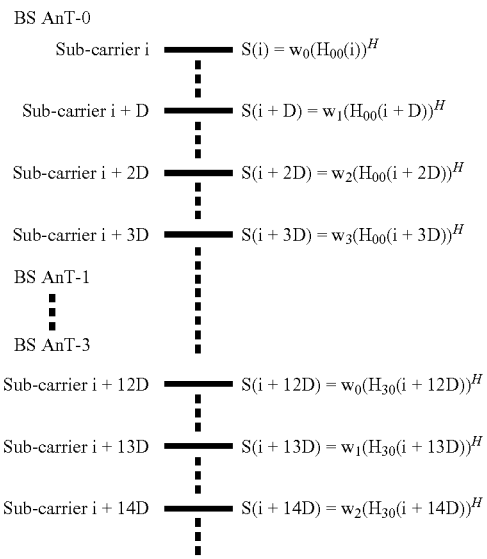

$w_k$ Beamforming weight for BS antenna-k
D Decimation factor

At the BS 102, in a step 406, the received signal on BSAnt-0 at subcarrier i, BSAnt-1 at subcarrier i+4D, BSAnt-2 at subcarrier i+8D, and BSAnt-3 at subcarrier i+12D are added and the resulting combined signal is:

$$r_0 = R_0(i) + R_1(i+4D) + R_2(i+8D) + R_3(i+12D)$$
$$= S(i)H_{00}(i) + S(i+4D)H_{10}(i) + S(i+8D)H_{20}(i) +$$
$$S(i+12D)H_{30}(i)$$

Next, in step 408, S(i), S(i+4D), S(i+8D), and S(i+12D), from the subcarrier chart immediately above, are plugged into the formula for $r_0$, with the following result:

$$r_0 = w_0(|H_{00}(i)|^2 + |H_{10}(i+4D)|^2 + |H_{20}(i+8D)|^2 + |H_{30}(i+12D)|^2)$$

Then, in step 410, the received signal on BSAnt-0 at subcarrier i+kD, the received signal on BSAnt-1 at subcarrier i+(4+k)D, the received signal on BSAnt-2 at subcarrier i+(8+k)D, and the received signal on BSAnt-3 at subcarrier i+(12+k)D are similarly combined to form the received signal $r_k$.

$$r_k = w_k(|H_{00}(i+kD)|^2 + |H_{10}(i+(4+k)D)|^2 + |H_{20}(i+(8+k)D)|^2 + |H_{30}(i+(12+k)D)|^2)$$

The phase of $w_k$ is detected from $r_k$ in step 412.

$$\text{Phase}(w_k) = \text{Atan}\left(\frac{\text{Im}(r_k)}{\text{Re}(r_k)}\right)$$

Where Atan( ) is the Arctangent function, Im( ) is the imaginary part of a complex number, and Re( ) is the real part of a complex number. The process ends at step 414.

In another embodiment of the present invention for both FDD and TDD systems, the SU 104 once again estimates channel parameters, and calculates the downlink beamforming weights $w_0$ for BS ant-0, $w_1$ for BS ant-1, $w_2$ for BS ant-2, and $w_3$ for BS ant-3, just as was done in step 302 of FIG. 3.

In the second step, as in step 312 of FIG. 3, the SU transmit the antenna weights on the UL sounding subcarriers.

Sub-carrier i ——— S(i) = $w_0$
Sub-carrier i + D ——— S(i + D) = $w_1$
Sub-carrier i + 2D ——— S(i + 2D) = $w_2$
Sub-carrier i + 3D ——— S(i + 3D) = $w_3$ $w_k$ Beamforming weight for BS antenna-k
D Decimation factor After receiving the UL sound signal, the BS receiver first estimate the UL channel characteristics using reference signals transmitted on UL sound channel (not shown in the figure above) or using other UL data transmission with known techniques. Then, the BS receiver determines the DL beamforming antenna weight factors according to

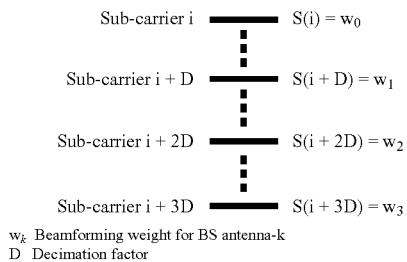

where R0(i+kD) is the receiver signal on BSAnt-0 at subcarrier i+kD, R1(i+kD) is the receiver signal on BSAnt-1 at subcarrier i+kD, R2(i+kD) is the receiver signal on BSAnt-2 at subcarrier i+kD, R3(i+kD) is the receiver signal on BSAnt-3 at subcarrier i+kD. $\hat{H}_{00}$(i+kD) is the estimated UL channel from MSAnt-0 to BSAnt-0 at subcarrier i+kD, $\hat{H}_{10}$(i+kD) is the estimated UL channel from MSAnt-0 to BSAnt-1 at subcarrier i+kD, $\hat{H}_{20}$(i+kD) is the estimated UL channel from MSAnt-0 to BSAnt-2 at subcarrier i+kD, $\hat{H}_{30}$(i+kD) is the estimated UL channel from MSAnt-0 to BSAnt-3 at subcarrier i+kD.

The derived weighting factors are then, in step 330, used at the BS 102 in downlink beamforming to transmit data to the SU 104 by utilizing the derived weight $\hat{w}_k$ for each of the transmit antennas BSAnt-0 through BSAnt-3. The process ends at step 332.

The three embodiments are for single data stream transmission, i.e., there is single data stream beamformed from one BS to one mobile. A similar approach can be extended to multiple data streams. In this case, there are simultaneously multiple data streams from one BS to one SU or from one BS to multiple SUs. Each data stream has a different set of beamforming weights. The SU 104 in this case calculates these sets of beamforming weights and feeds back the weights to the BS.

Exemplary Base Station Controller

Figure 5:
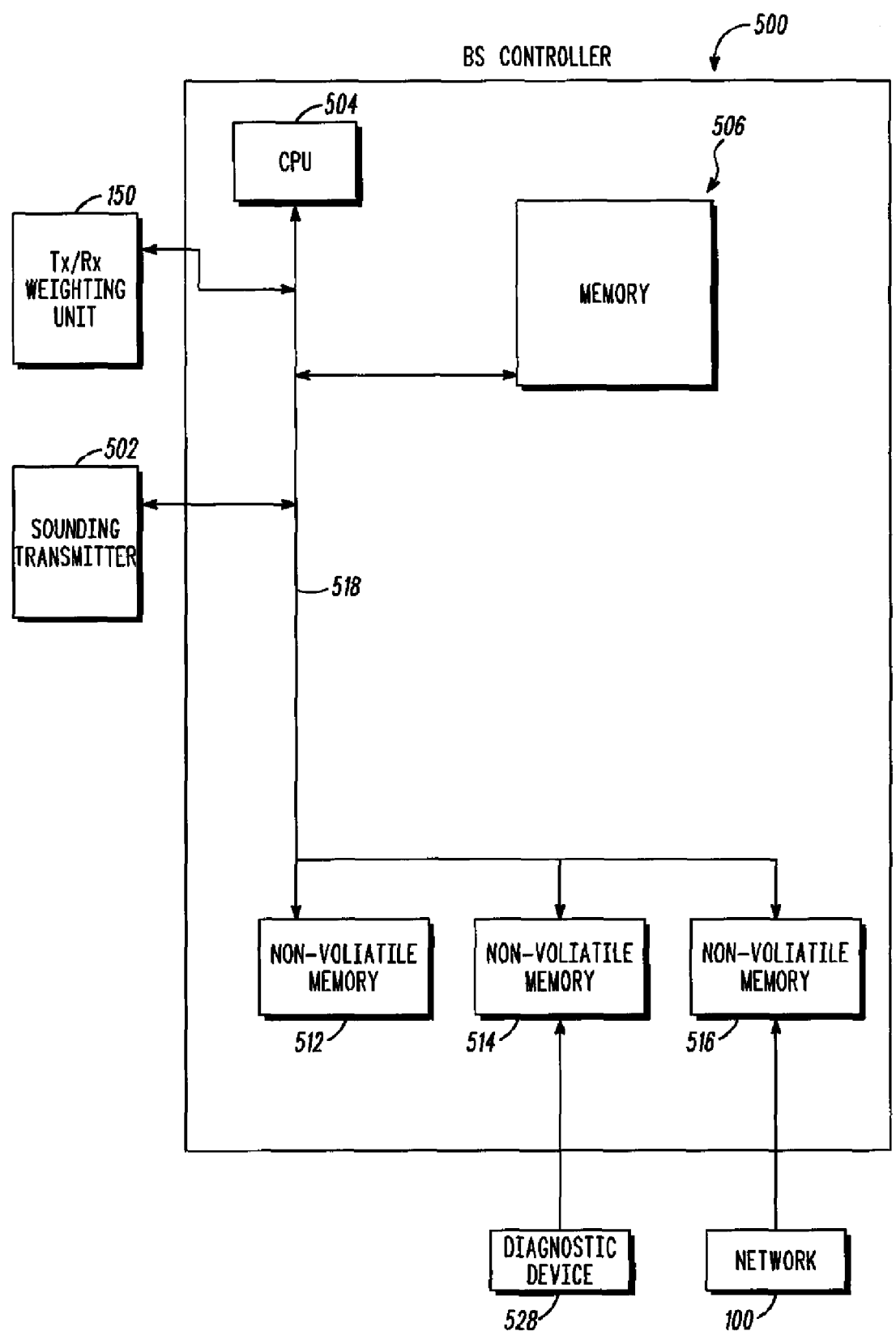
FIG. 5 is a block diagram illustrating an exemplary base station controller according to an embodiment of the present invention.

FIG. 5 is a block diagram illustrating a detailed view of a BS controller 500, such as the BS controller 118 of FIG. 1, according to an embodiment of the present invention. The BS controller 500, in one embodiment, resides within the BS 102. In other embodiments, the BS controller 500 resides outside of and is communicatively coupled to the BS 102. The BS controller 500 includes a processor 504 that is communicatively connected to a main memory 506 (e.g., volatile memory), a non-volatile memory 512, and a network adapter hardware 516 that is used to provide an interface to the network 100. The BS processor 504 acts as a weight extraction processor and extracts, by demodulating signals on the uplink subcarriers, a plurality of downlink transmission antenna weights comprising each of the respective complex values modulated onto each respective uplink subcarrier.

An embodiment of the present invention can be adapted to work with any data communications connections including present day analog and/or digital techniques or via a future networking mechanism. The BS 500 also includes a man-machine interface ("MMI") 514. The MMI 514, in one embodiment, is used to directly connect one or more diagnostic devices 528 to the BS controller 500. A system bus 518 interconnects these system components.

The BS controller 500 is coupled to a sounding transmitter 502 to control the transmission of sounding signals to the remote SU devices, as described above. The BS controller 500 is also coupled to a Tx/Rx weighting unit 150 and controls the transmit (Tx) antenna weights and the receiver (Rx) antenna weights that are applied to each transmit and receive antenna, as is described above.

It should be understood from the previous description that, in one embodiment of the present invention, there is only one downlink data stream transmitted from the BS to the SU. In other embodiments, however, there is more than one data stream transmitted at the same time from one BS to one SU (known as single user MIMO beamforming; MIMO is defined as multi input multiple output comprising multiple transmit/receive antennas at the base stations and SU); or from one BS to multiple SUs (known as multi user MIMO beamforming). For each data stream, there is a set of base station antenna weights. Therefore, if there are two downlink data streams per SU 8 weight factors need to be fed back. The first 4 weights correspond to data stream 1, and the second 4 weights correspond to data stream 2.

Although the exemplary embodiments of the present invention are described in the context of a fully functional computer system, those skilled in the art will appreciate that embodiments are capable of being distributed as a program product via floppy disk, e.g. floppy disk, CD ROM, or other form of recordable media, or via any type of electronic transmission mechanism.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method on an RF communications receiver, the method comprising:

receiving n downlink pilot signals with at least one receive antenna at a receiver, each of the n downlink pilot signals being associated with a respective one of n downlink transmit antennas at a remote transmitter transmitting the n downlink pilot signals;

determining, based upon the received n downlink pilot signals, a respective RF propagation channel between each respective receive antenna within the at least one receive antenna at the receiver and each respective downlink transmit antenna within n downlink transmit antennas at the remote transmitter;

determining, based upon characteristics of each respective downlink RF propagation channel, n downlink transmit antenna weighting factors for each downlink data stream from the remote transmitter to the receiver, each downlink transmit antenna weighting factor within the n downlink transmit antenna weighting factors corresponding to a respective weighting factor to be applied to one respective downlink transmit antenna within n downlink transmit antennas and one respective downlink data stream being transmitted from the remote transmitter to the receiver within at least one downlink data streams;

modulating a respective modulation signal onto a first of n uplink subcarriers by summing, to produce a first sum, complex values corresponding to the respective RF propagation channel for a first subcarrier between n base station transmit antennas and the at least one transmitting receive antenna at the remote transmitter;

calculating a conjugate of the first sum;

multiplying a first of the n downlink antenna weighting factors by the conjugate of the first sum to produce the respective modulation signal; and scaling the respective modulation signal for the first subcarrier; and transmitting the uplink subcarriers through at least one transmitting receive antenna that is within the at least one receive antenna.

2. The method according to claim 1, wherein after calculating a conjugate of the first sum, the method comprises quantizing the first downlink antenna weight.

3. A method on an RF communications receiver, the method comprising:

receiving n downlink pilot signals with at least one receive antenna at a receiver, each of the n downlink pilot signals being associated with a respective one of n downlink transmit antennas at a remote transmitter transmitting the n downlink pilot signals;

determining, based upon the received n downlink pilot signals, a respective RF propagation channel between each respective receive antenna within the at least one receive antenna at the receiver and each respective downlink transmit antenna within n downlink transmit antennas at the remote transmitter;

determining, based upon characteristics of each respective downlink RF propagation channel, n downlink transmit antenna weighting factors for each downlink data stream from the remote transmitter to the receiver, each downlink transmit antenna weighting factor within the n downlink transmit antenna weighting factors corresponding to a respective weighting factor to be applied to one respective downlink transmit antenna within n downlink transmit antennas and one respective downlink data stream being transmitted from the remote transmitter to the receiver within at least one downlink data stream;

modulating a respective modulation signal onto a first of n uplink subcarriers by identifying n sets of weight products, each of the n sets of weight products containing a respective n weight products and wherein each set of weight products within the n sets of weight products is to be received by a respective downlink transmit antenna within the n downlink transmit antennas at the remote transmitter;

associating each weight product of the (n*n) weight products with a respective subcarrier, associating each of the n weight products within each of the n sets of weight products with a respective associated downlink transmit antenna weighting factor within the n downlink transmit antenna weighting factors, wherein each of the n sets of weight products comprise n weight products that are each associated with different respective downlink transmit antenna weighting factors;

associating each set of weight products within the n sets of weight products with a respective associated RF propagation channel;

calculating each of the weight products by determining a respective product of the respective associated downlink transmit antenna weighting factor for that weight product and a complex value evaluation of the respective associated RF propagation channel for the respective associated subcarrier associated with that weight product;

modulating each of the respective subcarriers with its associated weight product; and transmitting the uplink subcarriers through at least one transmitting receive antenna that is within the at least one receive antenna.

4. The method according to claim 3, further comprising:

quantizing, prior to the calculating the n weight products, each of the n downlink transmit antenna weighting factors, and wherein the calculating the n weight products uses respective associated downlink transmit antenna weighting factors that are quantized downlink transmit antenna weighting factors.

* * * * *